United States Patent [19]

Tahon et al.

[11] Patent Number: 5,776,642
[45] Date of Patent: Jul. 7, 1998

[54] METHOD FOR MANUFACTURING A MULTICOLOR FILTER ARRAY ELEMENT

[75] Inventors: Jean-Pierre Tahon, Leuven; Johan Loccufier, Zwijnaarde; Herman Van Gorp, Tielen; Bart Ramandt, Brugge, all of Belgium

[73] Assignee: Agfa Gevaert, N.V., Mortsel, Belgium

[21] Appl. No.: 657,111

[22] Filed: Jun. 3, 1996

[30] Foreign Application Priority Data

Jun. 27, 1995 [EP] European Pat. Off. ............... 95201742

[51] Int. Cl.$^6$ .................................................. G02B 5/20
[52] U.S. Cl. .................................................. 430/7; 430/428
[58] Field of Search ........................... 430/7, 428, 429; 349/106

[56] References Cited

U.S. PATENT DOCUMENTS 5,206,119  4/1993  Kuse et al. ............................. 430/372
5,462,822  10/1995  Roosen et al. .......................... 430/7

FOREIGN PATENT DOCUMENTS 3085984  1/1986  Australia .
0072775  2/1983  European Pat. Off. .
0615161  9/1994  European Pat. Off. .
1392134  4/1975  United Kingdom .

OTHER PUBLICATIONS

Abstract of JP 3-209202, "Color Filter", Mochizuki et al. (Sep. 1991).

*Primary Examiner*—John A. McPherson
*Attorney, Agent, or Firm*—Breiner & Breiner

[57] ABSTRACT

A method is provided for manufacturing a multicolour filter array element, firmly associated with a transparent electrode layer in a multicolour liquid crystal display device, comprising a silver halide colour photographic material wherein the colour processing of the silver halide colour material comprises a treatment of the colour processed colour material in a solution comprising at least one group III metal ion. The processing method diminishes the yellowing, due to heating, of the processed photographic silver halide colour material.

6 Claims, No Drawings

METHOD FOR MANUFACTURING A MULTICOLOR FILTER ARRAY ELEMENT

1. FIELD OF THE INVENTION

This invention relates to a method for processing a colour photographic material. It also relates to a method for the production of a multicolour filter array element, comprising processed colour photographic material.

2. BACKGROUND OF THE INVENTION

Liquid crystal display devices are used nowadays in numerous applications such as clocks, household appliances, electronic calculators, audio equipment, etc. There is a growing tendency to replace cathode ray tubes by liquid crystal display devices being favoured for their smaller volume and lower power consumption. In some applications like e.g. laptop computers and pocket TV's liquid crystal display devices are even without competition.

High definition television in its ultimate version will require screen diagonals exceeding 50 inch (see P. Plezhko in the periodical Information Display September 1991, Vol. 7 no. 9, p. 19 a.f.). Although not yet in existence CRT-based 50 inch screens can be expected to be very impractical because of their weight and size. Liquid crystal technology is basically able to produce high definition television (HDTV) screens with moderate weight and size.

Liquid crystal display devices generally include two spaced glass panels, which define a sealed cavity, which is filled with a liquid crystal material. The glass plates are covered with a transparent electrode layer which may be patterned in such a way that a mosaic of picture elements (pixels) is created.

Full colour reproduction is made possible by the use of a colour filter array element inside the liquid crystal display device.

Two addressing systems are used to drive the display: either a passive system or an active system.

According to the passive system in the liquid crystal device the two electrode layers are patterned in a regular array of stripes. The stripes on one plate are perpendicular to those on the other plate.

The application of a voltage across two opposing stripes causes a change in the optical properties of the liquid crystal material situated at the crossing point of the two stripes, resulting in a change of the light transmission through the energized picture element called pixel.

According to the active system, which greatly improves the performance of the liquid crystal display device, each pixel has its own individual microelectronic switch, which means that such a microswitch is connected to an individual transparent pixel electrode, the planar size of which defines the size of the pixel. The microswitches are individually addressable and are three-terminal or two-terminal switching elements.

Three-terminal switches are formed by thin film transistors (TFT). These transistors are arrayed in a matrix pattern on a glass plate which together with a glass plate carrying a transparent uniform (non-patterned) electrode layer forms a gap filled with the liquid crystal material.

With a diode or a similar two-terminal switching device the transparent electrode layer must be patterned.

To impart colour reproduction capability to the liquid crystal display device a colour filter array element is provided on one of the two glass plates. In an active matrix display, examples of which are described in U.S. Pat. Nos. 5,081,004 and 5,003,302, this is usually the glass plate opposite the glass plate carrying the switching elements.

A colour filter array for full colour reproduction consists of red, green and blue patches arranged in a given order. For contrast improvement the colour patches may be separated by a black contour line pattern delineating the individual colour pixels (ref. e.g. U.S. Pat. No. 4,987,043).

In order to prevent loss of effective voltage over the liquid crystal material the colour filter is preferably kept out of the electrical circuit which means that the transparent electrode is deposited on top of the colour filter array element.

Several techniques for making colour filter array elements have been described in the prior art.

A first widely used technique operates according to the principles of photolithography (ref. e.g. published EP-A 0 138 459) and is based on photo-hardening of polymers e.g. gelatin. Dichromated gelatin, doped with a photosensitizer is coated on glass, exposed through a mask, developed to harden the gelatin in the exposed areas and washed to remove the unexposed gelatin. The remaining gelatin is dyed in one of the desired colours. A new gelatin layer is coated on the dyed relief image, exposed, developed, washed and dyed in the next colour, and so on. By that wash-off and dying technique four complete operation cycles are needed to obtain a red, green and blue colour filter array having the colour patches delineated with a black contour line. As an alternative dyeable or coloured photopolymers are used for producing superposed coloured photoresists. In the repeated exposures a great registration accuracy is required in order to obtain colour filter patches matching the pixel-electrodes.

In a modified embodiment of said photoresist technique organic dyes or pigments are applied by evaporation under reduced pressure (vacuum evaporation) to form a coloured pattern in correspondence with photoresist openings [ref. Proceedings of the SID, vol. 25/4, p. 281–285, (1984)]. As an alternative a mechanical precision stencil screen has been used for pattern wise deposition by evaporation of dyes onto a selected substrate (ref. e.g. Japan Display 86, p. 320–322.

According to a second technique dyes are electrodeposited on patterned transparent electrodes from a dispersion of curable binder polymers, dispersing agents and coloured pigments. For each colour a separate deposition and curing step is needed.

According to a third technique said red, green and blue dyes are deposited by thermal transfer from a dye donor element to a dye-receiving element, comprising a transparent support, e.g. glass plate, having thereon a dye-receiving layer. Image-wise heating is preferably done by means of a laser or a high intensity light flash. For each colour a separate dye transfer step must be carried out.

According to a fourth technique as described e.g. in U.S. Pat. No. 4,271,246 a method of producing a multicolour optical filter comprises the steps of (1) exposing a photographic material comprising a support and a single, i.e. one, black-and-white silver halide emulsion layer to light through a first pattern;

(2) developing the exposed emulsion layer with a first coupler-containing colour developer to form a pattern of a first dye; then (3) exposing an unexposed portion of said emulsion layer to light through a second pattern;

(4) developing the exposed area with a second coupler-containing colour developer to form a pattern of a second dye;

(5) repeating exposure and development to form patterns containing dyes of third and optionally subsequent colours, thereby to form colour patterns of at least two colours; and subjecting the product to a silver removal treatment after the final colour development step.

All the above described techniques have in common that they require at least three (four if the black contour pattern requires a separate step) treatment steps, and some of them require very costly exposure apparatuses to reach the desired level of registration.

By the large number of production steps and the required accuracy the manufacturing yields, i.e. the percentage of the colour filter array elements made in the factory which meet quality control standards are exceptionally low. The very costly investments could be brought down when the filter production could be simplified and yet high quality maintained.

When using a multilayer colour photographic silver halide material for multicolour filter production comparable to colour print film used in the motion picture film industry the above mentioned problems related to image registration and large number of processing steps can be avoided. From one colour negative an unlimited number of colour positives on film can be produced at a very high rate. Only one exposure for each positive is needed. A great number of exposed positives can be chemically treated at the same time in the same machine. This makes the whole process very attractive from the viewpoint of yield and investment. Such process operating with a negative colour image as original to form a complementary colour pattern on a glass substrate has been described already in published Japanese patent application (Kokai) 60-133427.

EP-A 396 824 relates to a process for the production of a multicolour liquid crystal display device comprising a liquid crystal layer essentially consisting of nematic crystals in twisted or supertwisted configuration or smectic C (chiral smectic) ferroelectric liquid crystals wherein the liquid crystal molecules are aligned in such a way that said layer shows an electrically controllable rotation of the polarization plane of the light incident on the display. Said liquid crystal layer together with a multicolour filter element is arranged between front and rear transparent electrodes for altering pixelwise the electric field over the liquid crystal layer and said electrodes are associated respectively with a front and rear light polarizer element. Said process comprises in consecutive order the steps of:

(1) providing a photographic print material that contains on a glass support a plurality of differently spectrally sensitive silver halide emulsion layers, (2) subjecting said print material to a single step multicolour pixelwise exposure, (3) colour processing said exposed print material producing thereby in each silver halide emulsion layer a differently coloured pixel pattern, (4) coating said colour processed print material at its silver halide emulsion layer assemblage side with a hydrophobic water-impermeable organic resin layer, and (5) depositing by vacuum-coating one of said electrodes on said organic resin layer serving as a covering layer for said silver halide emulsion layer assemblage.

So, before introducing said multicolour filter in the liquid crystal device the uppermost emulsion layer of the thus processed photographic print material is coated with a hydrophobic water-impermeable organic resin to form a covering layer of said resin thereon, and by vacuum-deposition on top of the thus-applied resin coating a transparent electrically conducting (electrode) layer is formed.

Said resin layer on top of the colour filter array provides a good planarity and prevents the release of volatile substances from the emulsion layer during vacuum-deposition, e.g. by sputtering, of the transparent conducting layer. Usually a bake at 150° C. or even higher is needed to impart by curing a good impermeability to the resin layer.

In liquid crystal displays of the so-called twisted nematic (TN) type (as are the majority of active matrix liquid crystal displays) the transparent uniformly applied electrode and also the patterned electrode are covered with an alignment layer. This layer usually consists of a heat-cured polyimide resin. Rubbing this cured layer with e.g. a nylon cloth (ref. e.g. GB-P 1,505,192) in a given direction causes an orientation of the liquid crystal molecules near the surface of the layer in the rubbing direction.

From the preceding it is clear that the multicolour filter array element is subjected to rather severe heat treatment steps during the manufacture of the liquid crystal display element. These heating steps may not give rise to discolouration of the filter and dye fading.

Most dyes formed by a reaction based on the coupling of colour formers with oxidized colour developer of the p-phenylenediamine type have rather limited resistance to high temperatures and tend to become yellowish or brownish, while the blues turn to dark grey.

Since the dyes are formed in a coupling reaction between a colour coupler and the colour developing substance in its oxidized form, the structure of the colour developing substance is decisive also for the dye-stability. In most embodiments of colour development by means of colour couplers p-phenylenediamine type developing agents are used. In EP-A 459 210 derivatives of p-phenylenediamine yielding dyestuffs with improved fastness to light are described. Such colour developing substances are therefore advantageously used in the production of colour filters subjected later on to radiation and/or thermal treatment.

In EP-application 95200306 filed on Feb. 8, 1995 p-phenylenediamine derivatives giving more stable dyes after colour development have been disclosed.

Still the problem of yellowing under heat treatment remain and because the heat treatment of the colour filters incorporated in LCD is quite severe, but necessary, the advantages of using a photographic material to produce the colour filter (simplicity of the process) cannot be fully exploited, when the yellowing of the processed colour material due to heat is not diminished.

3. OBJECTS AND SUMMARY OF THE INVENTION

It is an object of the invention to provide a method for processing a silver halide colour photographic material, comprising at least three differently spectrally sensitive silver halide emulsion layers, each sensitive to blue, green and red light respectively, whereby the yellowing of the processed material, due to an heat treatment is lowered.

It is an other object of the present invention to provide a method for manufacturing a multicolour filter array element, firmly associated with a transparent electrode layer in a multicolour liquid crystal display device, using a developed photographic colour material as multicolour filter, which manufacture includes heat treatment steps and wherein the processed colour material is less susceptible to yellowing.

Other objects and advantages will become clear from the detailed description and examples which are not limitative to the scope of the present invention.

The objects of the present invention are realized by providing a method for manufacturing a multicolour filter array element, firmly associated with a transparent electrode layer in a multicolour liquid crystal display device, comprising the steps of:
(i) exposing a photographic silver halide colour material comprising a plurality of differently spectrally sensitive silver halide emulsion layers on a glass support, by a single step multicolour pixelwise exposure,
(ii) colour processing said exposed colour material producing thereby in each silver halide emulsion layer a differently coloured pixel pattern,
(iii) coating said colour processed colour material at its silver halide emulsion layer side with a hydrophobic water-impermeable organic resin layer
(iv) curing said organic resin layer by heating said layer at temperatures between 100° C. and 250° C.
(v) depositing a transparent electrode layer on said organic resin layer and
(vi) coating an alignment layer on top of said transparent electrode layer, characterised in that said colour processing comprises the treatment of said colour processed material in a solution comprising ions of at least one group III metal.

Preferably said treatment proceeds in a solution comprising ions of at least one metal selected from the group consisting of Al, Ga and In.

In a further preferred embodiment said treatment proceeds in a solution comprising $Al^{3+}$-ions originating from single salts or from mixed salts.

4. DETAILED DESCRIPTION OF THE INVENTION

It has been found that the yellowing by heat of a processed silver halide colour photographic material, can greatly be enhanced by giving the colour material a treatment in a solution comprising ions of at least one group III metal. Especially the treatment in a solution comprising ions of at least one metal selected from the group consisting of Al, Ga and In has proven to be beneficial.

It is, for a treatment according to the present invention, preferred to use a solution comprising $Al^{3+}$-ions originating from single salts or from mixed salts.

The solution comprising the metal ions, described above, can comprise said ions in a concentration between 0.01 and 1 mole/liter, preferably between 0.05 and 0.5 mole/liter, more preferably between 0.05 and 0.2 mole/liter.

The solvent for a solution, useful for a treatment according to the present invention, is preferably an aqueous solvent. The aqueous solvent can consist of 100% of water, or can consist of water mixed with one or more polar solvents. The polar solvents are preferably lower alkyl alcohols, more preferably ethanol or methanol. When a polar solvent is mixed with water to form the aqueous solution, it is preferred that not more than 50% by volume of the polar solvent is present.

The solution, for a treatment according to the present invention, can comprise any surfactant known in the art. It can comprise anionic surfactants, cationic surfactants as well as non-ionic surfactants.

The treatment with the solution of the metal ions described above, proceeds preferably after the colour material has been bleached and fixed (this bleaching and fixing can proceed in a single step, wherein fixing and bleaching proceed simultaneously.).

A treatment according to the present invention can take from 10 seconds to 10 minutes of time, but preferably is adjusted so as to be between 5% to 50% of the time the material resides in the colour developer.

It is preferred to rinse the material after said bleaching and fixing and before the treatment in a solution comprising ions of at least one group III metal.

After the treatment in a solution comprising ions of at least one group III metal, the colour material can be dried directly, or more preferably the after a rinsing step. After the treatment of the colour material in a solution comprising group III metal ions, the material can receive further treatments, e.g. rinsing, treatment in a hardener solution, etc.

The processing cycle of a colour material, comprising a treatment according to the present invention can comprise e.g. the steps of: (i) developing, (ii) rinsing, (iii) bleach/fixing, (iv) rinsing, (v) treatment in a solution comprising at least one group III metal ion, (vi) rinsing, (vii) treatment in an hardener solution, (viii) rinsing and (ix) drying.

It is clear that further steps can be added to or some steps omitted from the processing sequence of a colour material, the processing sequence still being within the scope of the present invention: it is e.g. possible instead of having a single bleach/fixing step to replace this single step by the steps of fixing, bleaching, fixing again and include further rinsing steps between the fixing, bleaching and fixing steps. It is e.g. possible to split the single bleach/fixing step in the steps of (iiia) fixing, (iiib) rinsing, (iiic) bleaching, (iiid) rinsing and (iiie) fixing. It is e.g. also possible to omit some of the rinsing steps and to omit the final hardening step. It is also possible to add between the development step and the first rinsing step a treatment in an acid stop bath.

The present invention includes thus a method for processing a silver halide colour material comprising a treatment of said colour processed colour material in a solution comprising ions of at least one group III metal.

Although the treatment in a solution, as described above, prevents the yellowing of any colour material known in the art, it is very interesting to use such a treatment in a method for manufacturing a multicolour filter array element, firmly associated with a transparent electrode layer in a multicolour liquid crystal display device, using a developed photographic colour material as multicolour filter, which manufacture includes heat treatment steps. This method for producing a multicolour filter array element, firmly associated with a transparent electrode layer in a multicolour liquid crystal display device, comprises the steps of:
(i) exposing a photographic silver halide colour material comprising a plurality of differently spectrally sensitive silver halide emulsion layers on a glass support, by a single step multicolour pixelwise exposure,
(ii) colour processing said exposed colour material producing thereby in each silver halide emulsion layer a differently coloured pixel pattern,
(iii) coating said colour processed colour material at its silver halide emulsion layer side with a hydrophobic water-impermeable organic resin layer
(iv) curing said organic resin layer by heating said layer at temperatures between 100° C. and 250° C.
(v) depositing a transparent electrode layer on said organic resin layer and
(vi) coating an alignment layer on top of said transparent electrode layer, and the colour processing comprises the treatment of said colour processed colour material in a solution comprising at least one group III metal ion. Such solutions have been described in detail herein above.

In a preferred embodiment the sequence wherein the differently spectrally sensitive silver halide emulsion layers are applied on a glass support for a photographic material that is especially useful in the method, according to this invention, for manufacturing a multicolour filter array element, is the sequence that is described in EP-A 615 161, which is incorporated herein by reference. In this application a photographic element is disclosed, wherein said element comprises on a glass support (i) a silver halide emulsion layer sensitive to blue light and containing a yellow dye forming colour coupler, (ii) a silver halide emulsion layer sensitive to green light and containing a magenta dye forming colour coupler, (iii) a silver halide emulsion layer sensitive to red light and containing a cyan dye forming colour coupler, wherein said layer (iii) is most remote from said support and in each silver halide emulsion layer the equivalent ratio of silver halide to colour coupler is at least 1.

The amount of silver halide present in each colour coupler containing layer is adjusted preferably in such a way that in the strongest exposed regions the colour coupler is completely converted to dye during the colour development. This means that the equivalent ratio of silver halide to colour coupler in the colour material should be preferably at least 10% higher than 1.

A ratio of 1 in equivalent amounts means that for each mole of colour coupler present in the layer 4 or 2 moles of silver halide are added, depending on whether the colour coupler is of the 4- or the 2-equivalent type.

In the transformation of one mole of a 4-equivalent colour coupler into one mole of dye, 4 moles of oxidized colour developer are involved, which means that 4 moles of silver halide must be reduced. In the case of a 2-equivalent colour coupler only 2 moles of silver halide are needed for a complete conversion.

In order to inhibit the diffusion of oxidized developing agent into neighbouring silver halide emulsion layers said layers are separated by an intermediary water-permeable colloid layer, e.g. gelatin-containing layer, comprising a scavenging agent for oxidized developing agent. Suitable scavenging agents for that purpose are diffusion-resistant hydroquinone derivatives, preferably containing one or more aliphatic ballast groups having at least 6 carbon atoms. Such scavenging agents and their use are described e.g. in The silver halide emulsion layer may contain any type of light-sensitive silver halide emulsion, e.g. an emulsion that forms a latent image primarily on the surfaces of the silver halide grains, or that forms an internal latent image predominantly in the interior of the silver halide grains. The emulsions can be negative-working emulsions, e.g. surface-sensitive emulsions or unfogged internal latent image-forming emulsions, or positive-working emulsions e.g. direct-positive emulsions of the unfogged, internal latent image-forming type, the development of which is conducted with uniform light exposure or in the presence of a nucleating agent. Further are mentioned direct-positive emulsions of the pre-fogged type wherein during image-wise exposure chlorine, bromine and/or iodine is liberated which image-wise destroys the developable centres created during overall prefogging. Direct-positive emulsions need only one development (as do negative emulsions).

Reversal silver halide emulsions are not prefogged. Their processing includes 2 development steps and a fogging step. The first development is carried out with a black-and-white developer whereby a negative black-and-white silver image is formed. The remaining silver halide is made developable by fogging, either physically (by exposure to light) or chemically. Upon subsequent colour development, bleaching and fixing a positive colour image is obtained.

By negative-working is meant that the density observed after processing is proportional to the exposure. By positive-working is meant that the silver halide emulsions yield upon exposure and development positive images, i.e. the density is inversely proportional to the exposure.

The applied silver halide can be of the silver chloride, the silver chloride-bromide, the silver bromide, the silver bromide-iodide or the silver chloride-bromide-iodide type.

The silver halide can be surface sensitized. Noble metal (e.g. gold), middle chalcogen (e.g. sulfur, selenium or tellurium), and reduction sensitizers, employed individually or in combination, are specifically contemplated. Typical chemical sensitizers are listed in Research Disclosure December 1989, item 308119, section III.

The silver halide can be spectrally sensitized with dyes from a variety of classes, including the polymethine dye class, which includes the cyanines, merocyanines, complex cyanines and merocyanines (i.e. tri-, tetra-, and polynuclear cyanines and merocyanines) oxonols, hemioxonols, styryls, merostyryls, and streptocyanines; see said Research Disclosure, section IV.

Suitable vehicles for the emulsion layers and other layers of the colour material are described in section IX of said Research Disclosure and brighteners and antifoggants are described respectively in sections V and VI, and hardeners for gelatin in section X.

As already mentioned hereinbefore colour filters for liquid crystal displays normally comprise a repeating pattern of coloured patches as in a mosaic pattern or may form a pattern of stripes. The coloured patches are preferably separated by a black contour line, which according to the present invention is formed by superposed area of the different emulsion layers wherein on colour-development cyan, magenta and yellow dye is formed respectively.

According to a preferred embodiment the reflections from the glass plate back into the multilayer arrangement are eliminated by the presence of a light-absorbing (anti-halation) layer between the glass substrate and the first photographic silver halide emulsion layer. This anti-halation layer must lose its light-absorbing properties during or after processing and become as clear as possible. To this end one or more dyes are present in said layer which dyes should be destroyed chemically in one or more processing liquids or simply be soluble in one or more of the processing liquids or in the rinse water and be washed out. It is advantageous to use anti-halation dyes of the non-diffusing type, i.e. dyes that are insoluble in water and do not migrate to adjacent layers during manufacture. Such is important when the dyes, due to their spectral or other properties, can change the photographic properties of the adjacent silver halide emulsion layers.

Yellow dyes of the non-diffusing type that may serve in decolourizable anti-halation layers for use in a multicolour colour material according to the present invention as illustrated in the accompanying drawing are described in U.S. Pat. No. 4,770,984.

Filter or anti-halation dyes may be present in one or more layers of the multilayer arrangement to decrease unwanted interlayer reflections and/or to improve the optical characteristics of individual layers. This practice is well known to those skilled in the art.

The multilayer arrangement of hydrophilic colloid (gelatin containing) layers of the present multicolour print material must stick very firmly to the glass substrate. The glass used for the substrate is e.g. borax glass, borosilicate glass, lime glass, potash glass, soda glass, crown glass, flint glass, silica-flint glass, chromium glass, zinc-crown glass or quartz glass. The glass support has e.g. a thickness in the range of 0.5 to 1.5 mm.

The so-called subbing layers currently used in colour print film on a resin support cannot be used due to the very different nature of the glass substrates.

A strong adhesion of the hydrophilic colloid multilayer arrangement to the glass support can be realized by means of a very thin subbing layer containing gelatin, a water-soluble inorganic silicon compound like e.g. sodium silicate (water glass) and a gelatin hardening agent.

An equally strong adhesion can be obtained without a subbing layer by the addition to the first layer, which in a preferred embodiment is a gelatin-containing light-absorbing anti-halation layer, of an organic silicon compound such as an epoxysilane and a hardening agent for gelatin.

When said layer after being freshly coated is treated at a temperature in the range of 34° to 40° C. and at a relative humidity in the range of 70 to 85% the adhesion of said subbing layer towards a gelatin-containing layer such as a gelatin-silver halide emulsion layer is much improved. Particularly suitable subbing layers on the basis of organic silicon compounds are described in U.S. Pat. No. 3,661,584 and GB-P 1,286,467.

The pixelwise exposure of the multicolour print material according to the present invention can be performed in several ways.

For example, the exposure may proceed in a single step through a multicolour master, in a plurality of steps with light of different colour (blue, green and red) through a pitchwise shiftable black-and-white mask or simultaneously or subsequently by means of pixelwise modulated laser beams of different colour, blue, green and red.

A convenient method for manufacturing the colour filters for use according to the present invention, especially in mass-production when a great number of them is needed, is to carry out the exposure in a single step through a multicolour master.

When used in conjunction with a negative type multilayer silver halide colour material the master must be a coloured negative master, whereas a coloured positive master is needed when a direct positive or reversal type multilayer silver halide colour material is involved.

A coloured negative master has predominantly yellow-, magenta- and cyan coloured pixels at the places corresponding respectively with the blue, green and red pixels on the colour filter array element.

In said single step exposure using a white light source the coloured master is in close or near contact with the multilayer silver halide colour material from which a colour filter is to be made, the gelatin layers of both materials facing each other. By said single step exposure simultaneously latent images in the 3 light-sensitive differently spectrally sensitive silver halide emulsion layers are formed.

Deviation from the desired spectral transmission characteristics of the filter area may be corrected by inserting in the white light beam filters changing the proportion of red, green and blue transmitted by the multicolour master.

The negative and positive masters may be made by means of other recording materials than silver halide emulsion type materials.

For example, the multicolour master may be made by photolithography, vacuum-deposition or electrodeposition of dyes, thermal transfer of dyes, electro(photo)graphy with coloured toner or ink-jet printing with coloured inks.

After processing the silver halide colour filter is covered with a protective resin layer which in the production of a multicolour filter associated with an electrode layer has to be present.

Since gelatin is a hydrophilic polymer it contains still a small amount of water even after thorough drying. Minor quantities of water may not enter the liquid crystal cell since they profoundly disturb the operation of the liquid crystal display. Moreover, during the application of the electrode layer by vacuum-deposition water or other volatile substance may not escape from the gelatin-containing layers and has to be kept blocked by a protective impermeable resin layer on top of the uppermost colour-developed silver halide emulsion layer of the colour filter. In the manufacture of a liquid crystal display according to the present invention heat-curable resins are used for producing said impermeable layer.

Examples of heat-curable organic resins and curing agents therefor are described by Ernest W. Flick in "Handbook of Adhesive Raw materials"—Noyens Publications—Park Ridge, N.J., USA (1982). Polyimide resins that can be heat-cured are e.g. the photo-curable polyimide resins disclosed in U.S. Pat. No. 4,698,295. Further are mentioned epoxy resins that can be heat-cured with amines thermally set free from an amine precursor e.g. ketimine which on reacting with water yields an amine [ref. The Chemistry of Organic Film Formers by D. H. Solomon, John Wiley & Sons, Inc. (1967), p.190].

The water-impermeable hydrophobic organic resin layer may be coated from a liquid composition containing (an) evaporatable solvent(s) or may be applied onto the processed multicolour material by lamination using e.g. a heat-curable layer sandwiched originally between a polyethylene film and a protective cover sheet analogously to the type of material described in J. photogr. Sci., 18, 150 (1970).

The wet strength of the colour processed gelatin containing silver halide emulsion layer assemblage before coating with the organic resin layer in step (4) of the present invention statement can be greatly improved as described in published EP-A 0 396 824 by a treatment with an aqueous composition containing the self-cross-linking reaction product of:

(i) an epihalohydrin or an Alpha-dihalohydrin,
(ii) a water-soluble polyamide, and
(iii) a water-soluble polyamine containing at least two nitrogen atoms separated by at least three carbon atoms and optionally also by at least one oxygen or sulphur atom and having at least two hydrogen atoms attached to different nitrogen atoms. Said self-cross-linking reaction product may form itself a water-impermeable hydrophobic organic resin layer serving as covering layer or as subbing layer for another outermost water-impermeable organic resin layer.

The preparation of the above defined self-cross-linking reaction product is given in GB-P 1 269 381, wherein said product is described for improving the wet strength of paper.

A transparent conductive layer forming the electrode layer is applied to the impermeable resin layer by known techniques, e.g. a transparent indium tinoxyde (ITO) layer is applied by vacuum-deposition.

Although the multicolour filter array elements prepared according to the present invention are very well suited for the production of active matrix liquid crystal displays there use is not restricted to that type of displays. They can be incorporated likewise in passive matrix liquid crystal displays, especially in supertwisted nematic (STN), double supertwisted nematic (DSTN), retardation film supertwisted nematic (RFSTN), in ferroelectric (FLC), guest host (GH), polymerdispersed (PF), polymer network (PN) liquid crystal displays, and so on. They can further be incorporated in emissive displays like electroluminescent displays, CRT devices and in charge coupled device (CCD) cameras.

The following examples illustrates the present invention without however limiting it thereto.

EXAMPLES

All formulas are given after the description of the various layers comprised in the material.

Following layers were coated in the order given on sodalime glass with a thickness of 1.5 mm to form a colour photographic material.

Anti-halation layer

A non-diffusing yellow dye of formula YD, was dispersed in gelatin. To this dispersion epoxysilane E (structure defined hereinafter) acting as an adhesion promoter was added. The coverages of yellow dye YD, gelatin and epoxysilane E were 0.5, 1.5 and 0.1 g/m² respectively.

Blue sensitive layer

A 100% silver chloride emulsion with an average grain size of 0.4 μm was sensitized to blue light with a spectral sensitizing agent of formula SB. A yellow dye forming coupler of formula Y1 was added to this emulsion.

The amounts of silver halide, gelatine and colour coupler Y1 were 0.57, 3.30 and 1.0 g/m² respectively.

First intermediate layer

A substance of formula SD, capable of scavenging oxidized colour developing agent was dispersed in gelatin and coated at a coverage of 0.08 g SD/m² and of 0.77 g gelatine/m².

Green sensitive layer

A silver chloride-bromide (90/10 molar ratio) emulsion with an average grain size of 0.12 μm was sensitized to green light with a spectral sensitizing agent of formula SG. A magenta dye forming coupler of formula M1 was added to this emulsion.

The amounts of silver halide, gelatin and colour coupler M1 were 0.71, 2.8 and 0.53 g/m² respectively.

Second intermediate layer

This layer has the same composition as the first intermediate layer.

Red sensitive layer

A silver chloride-bromide (90/10 molar ratio) emulsion with an average grain size of 0.12 μm was sensitized to red light with a spectral sensitizing agent of formula SR. A cyan dye forming coupler of formula C1 was added to this emulsion.

The amounts of silver halide, gelatin and colour coupler C1 were 0.49, 4.5 and 0.95 g/m² respectively.

Yellow, magenta and cyan water-soluble dyes, acting as accutance dyes were present at an appropriate coverage in the blue, green en red sensitive layer respectively and hydroxytrichlorotriazine acting as hardening agent was present in the red sensitive layer at a coverage of 0.035 g/m².

In the following Table 1 the silver halide to colour coupler ratio in equivalent amounts is given for the three light-sensitive layers of the material. The coverages of the colour couplers, expressed in mmoles/m², are also given.

TABLE 1

|  | Silver halide colour coupler (eq.) | mmol colour coupler/m² |
|---|---|---|
| Blue sens. layer | 1.2 | 1.4 |
| Green sens. layer | 1.2 | 0.9 |
| Red sens. layer | 1.3 | 1.1 |

CHEMICAL FORMULAS

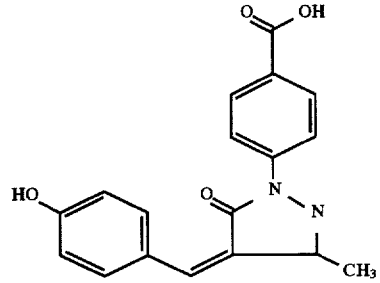

YD

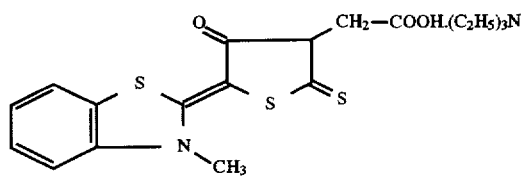

SB

TABLE 1-continued
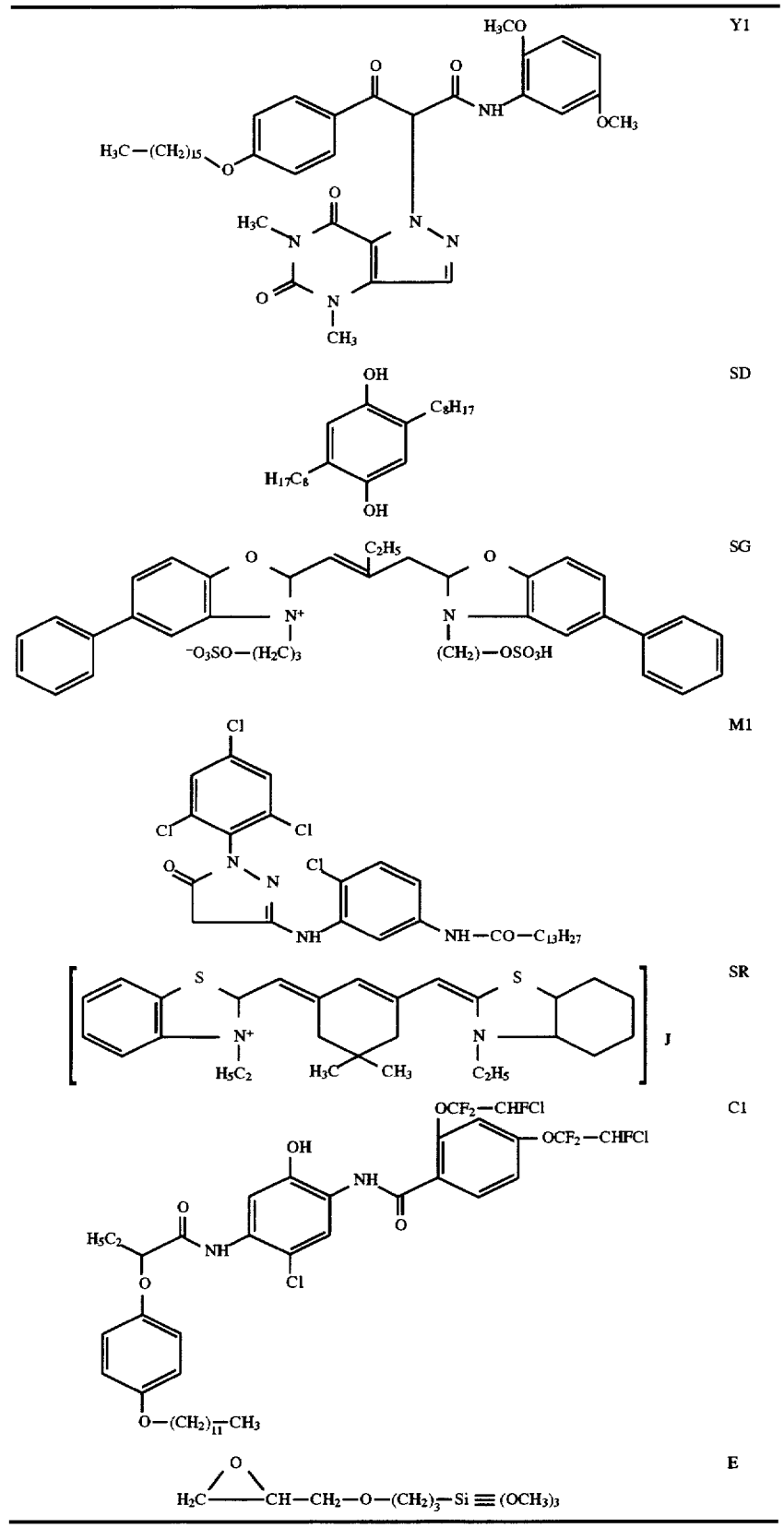

Unexposed sheets of the material were processed in the processing sequence: developing in a developer with composition as given herebelow:

| | |
|---|---|
| Sodium sulphite (anhydrous) | 4 g |
| 4-amino-3-methyl-N,N-diethylaniline hydrochloride | 3 g |
| sodium carbonate (anhydrous) | 17 g |
| sodium bromide | 1.7 g |
| sulphuric acid 7 N | 0.62 ml |
| water up to | 1000 ml |

After development each sheet was treated in an acid stop bath prepared by adding water up to 1 l to 50 ml of sulphuric acid 7N. The treatment with stop bath was followed by 2 minutes rinsing in plain water followed by a 2 minutes fixing in an aqueous solution having the following composition:

| | |
|---|---|
| 58% aqueous solution of $(NH_4)_2S_2O_3$ | 100 ml |
| sodium sulphite (anhydrous) | 2.5 g |
| sodium-hydrogen sulphite (anhydrous) | 10.3 g |
| water up to | 1000 ml |

The treatment with fixing liquid was followed by a 2 minutes rinsing in plain water followed by a 3 minutes bleaching in an aqueous solution having the following composition:

| | |
|---|---|
| potassium hexacyanoferrate (III) (anhydrous) | 30 g |
| sodium bromide (anhydrous) | 17 g |
| water up to | 1000 ml |

Thereupon each sheet was treated with the fixing liquid again and rinsed for 3 minutes with plain water. After this rinsing each sheet, except a comparative sheet, was treated in a solution comprising ions of at least one a group III in a concentration of 0.1 mole/liter for 5 minutes.

Sheet 1: no treatment (comparative)
Sheet 2: treatment in a solution of 0.1 mole/liter of $Al(NO_3)_3$
Sheet 3: treatment in a solution of 0.1 mole/liter of $Ga(NO_3)_3$
Sheet 4: treatment in a solution of 0.1 mole/liter of $In(NO_3)_3$
Sheet 5: treatment in a solution of 0.1 mole/liter of $Al_2(SO_4)_3$
Sheet 6: treatment in a solution of 0.1 mole/liter of Potassiumaluminiumsulfate.

Afterwards the sheets were rinsed.

Finally each sheet was treated with an aqueous solution having a pH of 9 and containing per liter 20 ml of a 40% aqueous solution of formaldehyde serving as hardening agent.

The sheet were submitted to a heat treatment at 200° C. during 60 minutes. The density increase of the fog, i.e. AD of a non-exposed sheet before and after the heat treatment, were measured on a transmission densitometer behind a blue filter.

The water absorption before and after the heat treatment were measured gravimetrically. A dry sample of the material was accurately weighted (W1) and then without exposure processed as described above, but taken out of the processing apparatus before the dryer. The processed, but not dried sample of the material was weighted again (W2) and after drying the sample was weighted again (W3). The difference between W2 and W3 was the water absorption of the sample, i.e. the amount of water per m² that has to be evaporated in the dryer.

The results are given in table 2.

TABLE 2

| Sheet number | Waterabs*. before heat | Waterabs*. after heat | ΔDensity of the fog |
|---|---|---|---|
| 1. (comparative) | 16.63 | 7.06 | 0.42 |
| 2. $(Al(NO_3)_3)$ | 16.63 | 9.07 | 0.27 |
| 3. $(Ga(NO_3)_3)$ | 16.65 | 8.07 | 0.27 |
| 4. $(In(NO_3)_3)$ | 17.64 | 9.58 | 0.34 |
| 5. $(Al_2(SO_4)_3)$ | 15.88 | 9.01 | 0.27 |
| 6. Potassiumaluminiumsulfate | 20.41 | 8.79 | 0.30 |

*in g/m²

It is clear that the treatment in a solution, comprising ions of at least one group III metal does not influence the water absorption of the material.

We claim:

1. A method for manufacturing a multicolour filter array element, firmly associated with a transparent electrode layer in a multicolour liquid crystal display device, comprising the steps of:
   (i) exposing a photographic silver halide colour material comprising a plurality of differently spectrally sensitive silver halide emulsion layers on a glass support, by a single step multicolour pixelwise exposure,
   (ii) colour processing said exposed colour material producing thereby in each silver halide emulsion layer a differently coloured pixel pattern,
   (iii) coating said colour processed colour material at its silver halide emulsion layer side with a hydrophobic water-impermeable organic resin layer,
   (iv) curing said organic resin layer by heating said layer at temperatures between 100° C. and 250° C.,
   (v) depositing a transparent electrode layer on said organic resin layer, and
   (vi) coating an alignment layer on top of said transparent electrode layer,
   characterized in that said colour processing comprises the steps of:
   (a) developing said exposed colour material,
   (b) bleaching and fixing said developed material,
   (c) rinsing said material with water, and
   (d) treating said material in an aqueous solution consisting essentially of a member selected from the group of single salts and mixed salts of a group III metal.

2. A method according to claim 1, wherein said group III metal is a member selected from the group consisting of Al, Ga and In.

3. A method according to claim 1, wherein said group III metal is Al.

4. A method according to claim 1, wherein said aqueous solution contains said member selected from the group consisting of single salts and mixed salts of a group III metal in a concentration between 0.01 and 1 mole/liter.

5. A method according to claim 1, wherein said aqueous solution contains said member selected from the group consisting of single salts and mixed salts of a group III metal in a concentration between 0.05 and 0.2 mole/liter.

6. A method according to claim 1, wherein said aqueous solution contains a member selected from the group of $Al(NO_3)_3$, $Ga(NO_3)_3$, $In(NO_3)_3$, $Al_2(SO_4)_3$, and potassium aluminum sulfate.

* * * * *